(12) United States Patent
She et al.

(10) Patent No.: US 9,794,933 B2
(45) Date of Patent: Oct. 17, 2017

(54) METHOD, APPARATUS AND EQUIPMENT FOR DETERMINING DEVICE CHANNEL RESOURCE(S) OF A USER EQUIPMENT

(71) Applicant: Alcatel Lucent, Boulogne Billancourt (FR)

(72) Inventors: Feng She, Shanghai (CN); Yun Deng, Shanghai (CN); Hongwei Yang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 43 days.

(21) Appl. No.: 14/431,654

(22) PCT Filed: Sep. 18, 2013

(86) PCT No.: PCT/IB2013/002410
§ 371 (c)(1),
(2) Date: Mar. 26, 2015

(87) PCT Pub. No.: WO2014/049435
PCT Pub. Date: Apr. 3, 2014

(65) Prior Publication Data
US 2015/0288507 A1    Oct. 8, 2015

(30) Foreign Application Priority Data
Sep. 28, 2012  (CN) .......................... 2012 1 0378010

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1854* (2013.01); *H04L 5/14* (2013.01); *H04W 72/042* (2013.01); *H04W 88/08* (2013.01)

(58) Field of Classification Search
CPC ................................................ H04W 72/0446
See application file for complete search history.

(56) References Cited

U.S. PATENT DOCUMENTS

2012/0120908 A1    5/2012   Ahn et al.
2012/0213163 A1*   8/2012   Lee ...................... H04L 1/1861
                                                              370/329
(Continued)

FOREIGN PATENT DOCUMENTS

| CN | 101547077 | 9/2009 |
| CN | 102326353 | 1/2012 |
| EP | 2 222 011 A2 | 8/2010 |

OTHER PUBLICATIONS

Huawei, "Implicit mapping between CCE and PUCCH for ACK/NACK TDD," 3rd Generation Partnership Project (3GPP), 3GPP TSG-RAN-WG1 Meeting #53, R1-082095, pp. 1-4, XP050110421, Kansas City, MO, USA, May 5-9, 2008.
(Continued)

*Primary Examiner* — Jason Mattis
(74) *Attorney, Agent, or Firm* — Fay Sharpe, LLP

(57) ABSTRACT

An objective of the present invention is to provide a method, apparatus, and equipment for determining device channel resources of a user equipment in an LTE-TDD system. The TDD system performs resource scheduling to the user equipment using an enhanced physical downlink control channel, and a physical uplink control channel used includes channel resource(s) for feeding back a hybrid automatic repeat request of a physical downlink shared channel as scheduled by the enhanced physical downlink control channel, when the number of downlink subframes as fed back in one uplink subframe may be more than one, the channel resource(s) is divided into a plurality of channel regions based on the number of downlink subframes having the enhanced physical downlink control channel set thereon
(Continued)

currently, or based on the potential highest number of downlink subframes having the enhanced physical downlink control channel set thereon. The present application obtains the device channel resource(s) occupied by the present user equipment in at least one channel region of the plurality of channel regions. The present invention enables the user equipment to feed back ePDCCH.

11 Claims, 5 Drawing Sheets

(51) Int. Cl.
*H04L 5/14* (2006.01)
*H04W 88/08* (2009.01)

(56) References Cited

U.S. PATENT DOCUMENTS

2013/0176917 A1* 7/2013 Lee ............... H04W 72/044
  370/280
2013/0230017 A1* 9/2013 Papasakellariou
  ............... H04W 72/0406
  370/330
2013/0242890 A1* 9/2013 He ............... H04L 5/1469
  370/329

OTHER PUBLICATIONS

Samsung, "Dynamic reconfiguration of TDD UL-DL configuration," 3rd Generation Partnership Project (3GPP), 3GPP TSG RAN WG1 #69, R1-122267, pp. 1-2, XP050600530, Prague, Czech Republic, May 21-25, 2012.

Motorola, "Views on Un HARQ Issues for TDD," 3rd Generation Partnership Project (3GPP), 3GPP TSG RAN1 #62, R1-104691, pp. 1-5, XP050449956, Madrid, Spain, Aug. 23-27, 2010.

International Search Report for PCT/IB2013/002410 dated Mar. 18, 2014.

Nokia Siemens Networks, et al. "HARQ-ACK resource allocation for data scheduled via ePDCCH", R1-121290, 3GPP TSG-RAN WG1 Meeting #68bis, Jeju, Korea, Mar. 26-30, 2012.

\* cited by examiner

METHOD, APPARATUS AND EQUIPMENT FOR DETERMINING DEVICE CHANNEL RESOURCE(S) OF A USER EQUIPMENT

FIELD OF THE INVENTION

The present invention relates to the field of communication technology, and more specifically, to a method, apparatus, and equipment for determining device channel resource(s) of a user equipment in an LTE-TDD system.

BACKGROUND OF THE INVENTION

In the prior art, adoption of the enhanced Physical Downlink Control Channel (ePDCCH) makes it possible to serve more users. Besides, it is noticed that there is a correspondence relationship between the number of Control Channel Elements (CCEs) and ACK/NACK region in Physical Uplink Control Channel (PUCCH). With the increasing number of CCEs, the corresponding PUCCH resources for uplink ACK/NACK might be insufficient. Some techniques have been introduced into the prior art to expect to alleviate the issue of insufficient resources. For example, lowest eCCE index number plus offset, and the like. However, although the lowest eCCE index number plus offset may be applied to a frequency division duplexing (FDD) system, it is not well applicable to a time division duplexing (TDD) system, because the TDD system not only has a one uplink subframe corresponding to one downlink subframe mode, but also has a one subframe corresponding to multiple downlink subframe mode. For example, as shown in FIG. 1, the uplink subframe within the circle corresponds to two downlink subframes, the uplink subframe at the left side of the uplink subframe within the circle corresponds to three downlink subframes, and the right-side uplink subframe corresponds to one downlink subframe, wherein one uplink subframe corresponding to one or more downlink subframes means the ACK/NACK of the one or more downlink subframes are reported in its corresponding uplink subframe. In this occasion, in a TDD system adopting ePDCCH, the lowest eCCE index number plus offset technique cannot be utilized. This issue can be better illustrated with reference to FIG. 2.

FIG. 2 shows a diagram of two downlink subframes provided with ePDCCH. The transversal axis of FIG. 2 represents time domain, while the longitudinal axis represents frequency domain, wherein the ACK/NACK of downlink subframes 1 and 2 are reported in one uplink subframe. In other words, FIG. 2 schematically shows a one uplink subframe corresponding to two downlink subframes mode. In order to serve more users, ePDCCH is added to a PDSCH (Physical Downlink Shared Chanel). However, the currently existing solution is not completely suitable for the TDD system. That is to say, in the TDD system, the existing PDCCH-specific system resource allocation scheme is not suitable for a TDD system with ePDCCH, while the "lowest eCCE index number plus offset" is not well suitable for the TDD system with the ePDCCH either.

SUMMARY OF THE INVENTION

An objective of the present invention is to provide a method, apparatus, and equipment for determining device channel resource(s) of a user equipment in an LTE-TDD system.

According to one aspect of the present invention, there is provided a method, in a user equipment of a TDD system, for determining device channel resource(s) of the present user equipment, wherein the TDD system performs resource scheduling to the user equipment using an enhanced physical downlink control channel, and a physical uplink control channel as used includes channel resource(s) for feeding back a hybrid automatic repeat request of a physical downlink shared channel as scheduled by the enhanced physical downlink control channel, when the number of downlink subframes as fed back in one uplink subframe may be more than one, the channel resource(s) is divided into a plurality of channel regions based on the number of downlink subframes having the enhanced physical downlink control channel set thereon currently, or based on the potential highest number of downlink subframes having the enhanced physical downlink control channel set thereon, the method comprising the following step:

a obtaining the device channel resource(s) occupied by the present user equipment in at least one channel region of the plurality of channel regions.

According to another aspect of the present invention, there is provided an apparatus, in a user equipment of a TDD system, for determining device channel resource(s) of the present user equipment, wherein the TDD system performs resource scheduling to the user equipment using an enhanced physical downlink control channel, and a physical uplink control channel as used includes channel resource(s) for feeding back a hybrid automatic repeat request of a physical downlink shared channel as scheduled by the enhanced physical downlink control channel, when the number of downlink subframes as fed back in one uplink subframe may be more than one, the channel resource(s) is divided into a plurality of channel regions based on the number of downlink subframes having the enhanced physical downlink control channel set thereon currently, or based on the potential highest number of downlink subframes having the enhanced physical downlink control channel set thereon, the apparatus comprising:

an acquiring module configured to obtain the device channel resource(s) occupied by the present user equipment in at least one channel region of the plurality of channel regions.

Compared with the prior art, the present invention has the following advantages: 1) it enables the user equipment to feed back HARQ (Hybrid Automatic Repeat Request) of the PDSCH scheduled by the ePDCCH; further, the present invention re-allocates the PUCCH resource(s), such that the user equipment can obtain the device channel resource(s) for feeding back the HARQ from within the PUCCH; 2) by providing the number of PRB pairs to the user equipment or directly providing the number of eCCEs of a downlink subframe via the base station, the lowest eCCE index plus offset can be suitable for the TDD system, which avoids the conflict issue caused by directly using the lowest eCCE index number plus offset by the TDD system in the prior art, and reduces resource waste; 3) for channel resource(s) for feeding back HARQ, the present invention can also adopt an interleaved mode for resource allocation.

BRIEF DESCRIPTION OF THE DRAWINGS

Through reading the detailed depiction of the non-limiting embodiments with reference to the accompanying drawings, other features, objectives and advantages of the present invention will become more apparent.

In the accompanying drawings, same or similar reference numerals represent same or similar components.

DETAILED DESCRIPTION OF THE PREFERRED EMBODIMENTS

Hereinafter, detailed depiction of the present invention will be further made with reference to the accompanying drawings.

Figure 1:
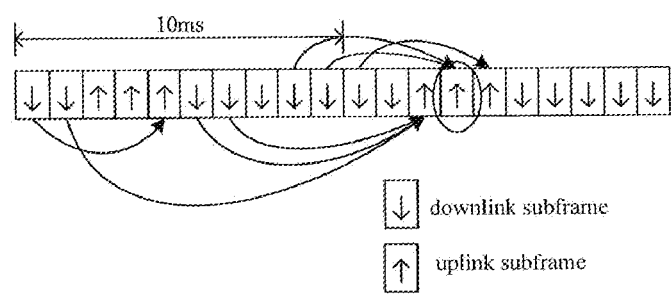
FIG. 1 shows a configuration diagram of TDD-based uplink/downlink subframes.
Figure 2:
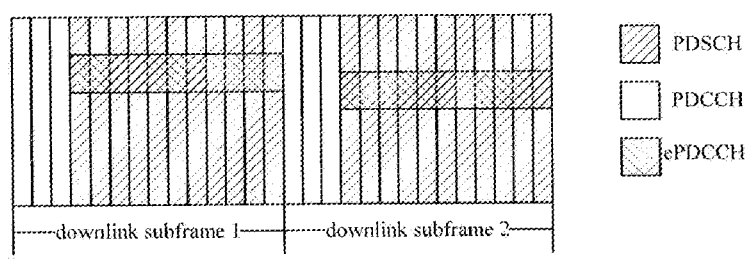
FIG. 2 shows a diagram of two downlink subframes with ePDCCH.
Figure 3:
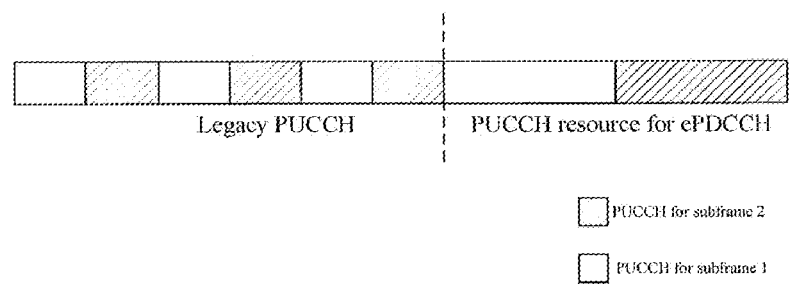
FIG. 3 shows a schematic diagram of PUCCH channel resource allocation according to one preferred embodiment of the present invention.

FIG. 3 shows a schematic diagram of PUCCH channel resource allocation of a TDD system with ePDCCH according to one preferred embodiment of the present invention. Besides the legacy PUCCH at the left side of the dotted line corresponding to PDCCH, the PUCCH further comprises channel resource(s) at the right side of the dotted line for feeding back the hybrid automatic repeat request (HARQ) of the PDSCH scheduled by the ePDCCH; preferably, the channel resource(s) at the right side of the dotted line is used for sending ACK/NACK. Besides, when the number of downlink subframes, which are fed back in one uplink subframe and have ePDCCH set thereon, may be more than one, the channel resource(s) is divided into a plurality of channel regions based on the current number of downlink subframes having ePDCCH set thereon, or based on the potential highest number of downlink subframes having ePDCCH set thereon; wherein, when each downlink subframe as fed back in one uplink subframe has an ePDCCH set thereon, the channel resource(s) is divided into a plurality of channel regions based on the current number of downlink subframes or the potential highest number of the downlink subframes.

Figure 4A:
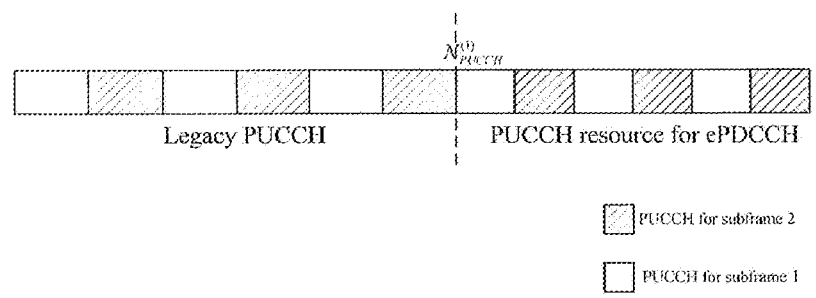
FIGS. 4a-4c show schematic diagrams of PUCCH channel resource allocation under multiple solutions.
Figure 4B:
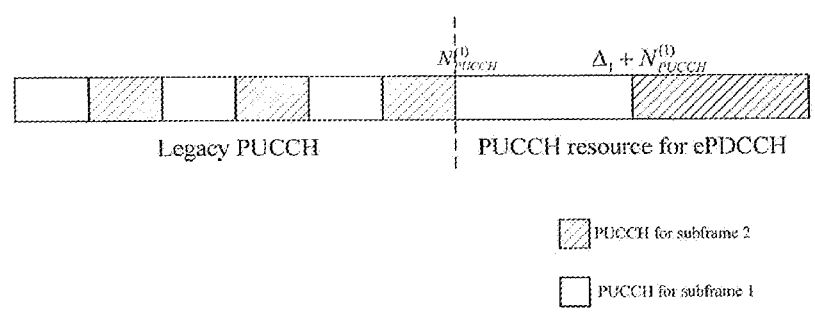
Figure 4C:
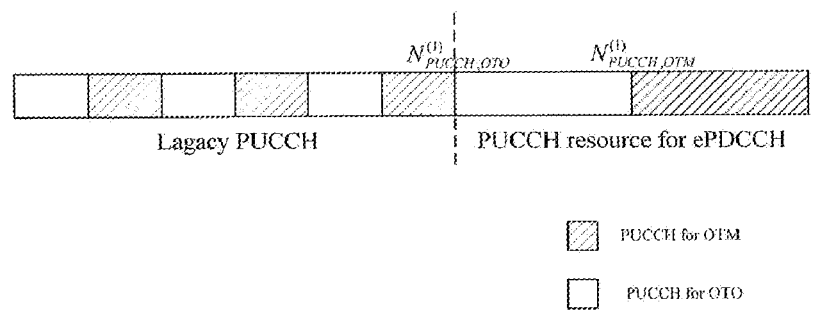

For example, please refer to FIG. 4c, in a TDD system, if each downlink subframe as fed back in one uplink subframe has an ePDCCH set thereon, and the number of downlink subframes as fed back in one uplink subframe can amount to two, then the channel resource(s) for feeding back HARQ at the right side of the dotted line may be divided into two channel regions based on the highest number of downlink subframes being two, wherein one channel region is allocated to a user equipment which performs HARQ feedback in a one uplink subframe to one downlink subframe mode, while the other channel region is allocated to a user equipment which performs HARQ feedback in a one uplink subframe to two downlink subframes, wherein one uplink subframe to one downlink subframe will be referred to as OTO hereinafter, while the one uplink subframe to multiple downlink subframes will be referred to as OTM hereinafter. It should be noted that when the number of downlink subframes as fed back in one uplink subframe may amount to three, the channel resource(s) for feeding back HARQ at the right side of the dotted line is divided into three channel regions, which three channel regions are allocated to a user equipment adopting OTO, a user equipment with one uplink subframe corresponding two downlink subframes in OTM, and a user equipment with one uplink subframe to three downlink subframes in OTM.

For another example, refer to FIG. 4b. If each downlink subframe as fed back in one uplink subframe has an ePDCCH thereon, and the number of downlink subframes as currently fed back in one uplink subframe is two, then the channel resource(s) for feeding back HARQ at the right side of the dotted line is divided into two channel regions based on the current number of downlink subframes being two, wherein one channel region is allocated to the downlink subframe 1, while the other channel region is allocated to the downlink subframe 2. It should be noted that the interleaved mode is not used in this example; besides, when the number of downlink subframes as currently fed back in one uplink subframe is three, then the channel resource(s) for feeding back HARQ at the right side of the dotted line is divided into three channel regions based on the current number of downlink subframes being three, which three channel regions are allocated to downlink subframes 1, 2, and 3, respectively.

For another example, refer to FIG. 4a. Like the above example, each downlink subframe as fed back in one uplink subframe has an ePDCCH set thereon, and the current number of downlink subframes as fed back by the user equipment is two. However, in this example, the interleaved mode is adopted for allocate channel resources, and given that the eCCE (enhanced Control Channel Element) of one downlink subframe is divided into three groups, then the user equipment, based on 2×3=6, determines that the channel resource(s) for feeding back HARQ at the right side of the dotted line is divided into 6 channel regions, and the channel regions for feeding back downlink subframe 1 and downlink subframe 2 are interleavedly distributed as shown in FIG. 4a. It should be noted that, if the number of downlink subframes as currently fed back in one uplink subframe in this example is changed to 3, then the user equipment, based on 3×3=9, determines that the channel resource(s) for feeding back HARQ at the right side of the dotted line is divided into 9 channel regions, and the channel regions for feeding back the downlink subframe 1, downlink subframe 2, and downlink subframe 3 are interleavedly distributed in order.

It should be noted that, the above examples shown with reference to FIGS. 3 and 4a-4c are only examples, and other existing or future possibly evolved channel resources for feeding back HARQ, if applicable to the present invention, should also be included within the protection scope of the present invention, which are incorporated here by reference.

The user equipment of the present invention performs the following step:

obtaining device channel resource(s) occupied by the present user equipment in at least one channel region of the plurality of channel regions divided from channel resource(s) for feeding back HARQ.

Figure 5:
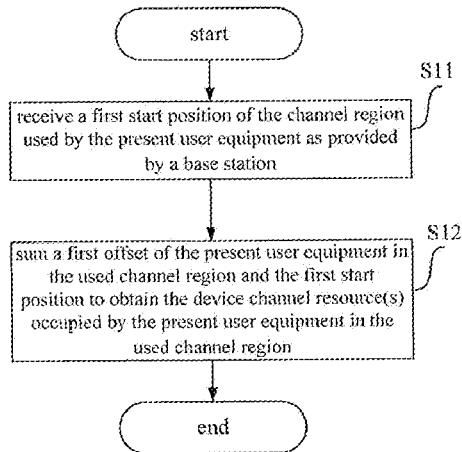
FIG. 5 shows a flowchart of a method for determining device channel resource(s) occupied by a user equipment in at least one channel region of a plurality of channel regions that are divided from channel resources for feeding back HARQ according to one preferred embodiment of the present invention.
Figure 6:
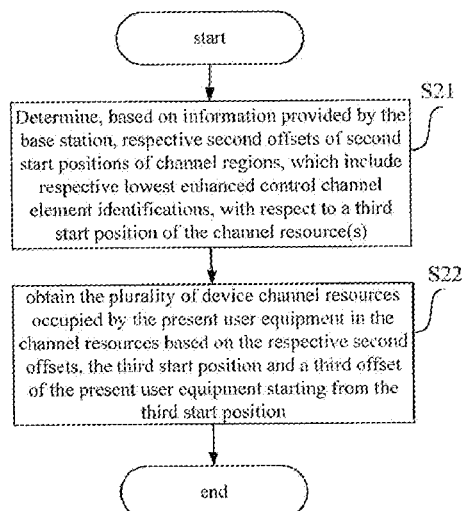
FIG. 6 shows a flowchart of a method for determining device channel resource(s) occupied by a user equipment in at least one channel region of a plurality of channel regions that are divided from channel resources for feeding back HARQ according to another preferred embodiment of the present invention.

Specifically, the user equipment may adopt a plurality of manners to obtain the device channel resource(s) occupied by the present user equipment in at least one channel region of the plurality of channel regions divided from channel resource(s) for feeding back HARQ, which will be further explained infra with reference to FIGS. 5 and 6.

Refer to FIG. 5. In one preferred embodiment, the channel resource(s) for feeding back HARQ is divided into a plurality of channel regions based on the highest number of downlink subframes, and the different channel regions divided from the channel resource(s) for feeding back HARQ are allocated to user equipments adopting a different number of downlink subframes. Then, in this embodiment, the user equipment only occupies the device channel resource(s) in one channel region at one time point; the user equipment in this embodiment performs the following steps S11 and S12.

In step S11, the user equipment receives a first start position of the channel region provided by the base station while used by the present user equipment; wherein the used channel region may be determined by a base station, for example, eNB, based on the potential highest number of downlink subframes having the enhanced physical downlink control channel set thereon, wherein the first start position of the channel region is determined by the base station and provided to the user equipment.

For example, refer to FIG. 4c, the channel resource(s) for feeding back HARQ is divided into two channel regions based on the highest number of downlink subframes with the enhanced physical downlink control channel thereon being two, wherein the channel region without shading is allocated to a user equipment adopting OTO, while the channel region indicated by oblique shading is allocated to the user equipment adopting a one uplink subframe to two downlink subframes in OTM; if the present user equipment adopts OTO, then the present user equipment currently uses the channel region without shading, and the base station provides the first start position $N^{(1)}_{PUCCH,OTO}$, which is already configured by the said base station, of the channel region without shading to the present user equipment; if the present user equipment currently adopts OTM, then the present user equipment currently uses the channel region indicated by oblique shading, and the base station provides the first start position $N^{(1)}_{PUCCH,OTM}$ of the channel region indicated by oblique shading as already configured by the said base station to the present user equipment.

It should be noted that the above example is only for better illustrating the technical solution of the present invention, not intended to limit the present invention. Those skilled in the art should understand that any implementation manner of receiving a first start position of the channel region used by the present user equipment as provided by the base station should be included within the scope of the present invention.

In step S12, the user equipment obtains the device channel resource(s) occupied by the present user equipment in the used channel region by the first start position plus a first offset of the present user equipment in the used channel region, wherein the first offset is determined by the present user equipment through blind detection. For example, the user equipment blind detects the lowest eCCE index number in its subframe so as to determine its first offset $n_{eCCE}$ and the like in its used channel region.

Please refer to 4c. If the user equipment adopts OTO, then the start of the device channel resource(s) occupied by the user equipment in the used channel region without shading is $n_{PUCCH}^1 = n_{eCCE} + N_{PUCCH,OTO}^{(1)}$; if the user equipment adopts OTM, then the start of the device channel resource(s) occupied by the user equipment in the used channel region indicated by oblique shading is $n_{PUCCH}^1 = n_{eCCE} + N_{PUCCH,OTM}^{(1)}$. Thus, the user equipment can determine the device channel resource(s) occupied by itself in the used channel region indicated by oblique shading.

It should be noted that the above example is only for better illustrating the technical solution of the present invention, not intended to limit the present invention. Those skilled in the art should understand that any implementation manner of determining the device channel resource(s) occupied by the present user equipment in the used channel region by the first start position plus a first offset of the present user equipment in the used channel region should be included within the protection scope of the present invention.

It should be further noted that in step S11, the user equipment can receive each first start position in OTO and each OTM together as configured by the base station, for example, configured through signaling, and then in the step S12, the user equipment selects a corresponding first start position based on the currently adopted OTO or OTM.

Refer to FIG. 6. As one preferred embodiment, the channel resource(s) for feeding back HARQ is divided into a plurality of channel regions based on the current number of downlink subframes corresponding to one uplink subframe in the user equipment, and one channel region is allocated to perform feedback for one downlink subframe.

Here, the scenario in which one channel region is allocated to perform feedback for one downlink subframe may comprise:

1) each of the channel regions has a one-to-one correspondence with one of the downlink subframes, as shown in FIG. 4b;

2) the enhanced control channel elements of each downlink subframe are divided into N groups, each channel region corresponds to a group of enhanced control channel elements, and the multiple of groups of enhanced control channel elements of respective downlink subframes are distributed in an interleaved mode, as shown in FIG. 4a.

The user equipment in the present embodiment performs step S21 and step S22.

In step S21, the user equipment, based on the information provided by the base station, determines respective second offsets of respective second start positions of channel regions, which including respective lowest eCCE index numbers, with respect to a third start position of the channel resource(s) for feeding back HARQ.

Here, the information provided by the base station may include, but not limited to, at least one of the following items:

1) information about the number of downlink physical resource block (PRB) pairs as included in one downlink subframe and allocated to the enhanced physical downlink control channel;

2) the number of all eCCEs included in one downlink subframe.

Preferably, the information provided by the base station may further comprise information of downlink subframe having ePDCCH set thereon, so as to be available for the user equipment to determine the downlink subframe having ePDCCH set thereon.

Specifically, the manners in which the user equipment, based on the information provided by the base station, determines respective second offsets of respective second start positions of channel regions including respective lowest eCCE index numbers with respect to a third start position of the channel resource(s), include, but not limited to:

i) each of the channel region has an one-to-one correspondence with one of the downlink subframe; then the user equipment, based on the information provided by the base station, determines the number of eCCEs included in one ePDCCH subframe, takes each channel region as the one including the lowest eCCE index number, and determines, based on the number of eCCEs, respective second offsets of the second start positions of respective channel regions with respect to a third start position $N_{PUCCH}^{(1)}$ of the channel resource(s) for feeding back HARQ. Preferably, the third start position $N_{PUCCH}^{(1)}$ is a reference value that should be used in the case of scheduling, in the ePDCCH, an eCCE for the present user equipment, when determining the device channel resource(s) for sending the HARQ feedback of the PDSCH corresponding to the present user equipment.

For example, refer to FIG. 4b. The channel regions without shading and those indicated by oblique shading have a one-to-one correspondence with the downlink subframe 1 and the downlink subframe 2, respectively. If the information provided by the base station directly contains the number $N_{eCCE}^{m}$ of all eCCEs included in one downlink subframe, the user equipment directly derives the $N_{eCCE}^{m}$ from the information provided by the base station; if the information provided by the base station includes PRB pair number information $N_m$ included in one downlink subframe, then the user equipment needs to determine $N_{eCCE}^{m}=N_m \times N_{eCCE}$ in consideration of $N_m$ and the eCCE number $N_{eCCE}$ included in each PRB as derived based on the standard.

Next, since the channel regions and downlink subframes have a one-to-one correspondence and each subframe should have a lowest eCCE index number, the user equipment may regard each channel region as the one including the lowest eCCE index number, and determines, based on $N_{eCCE}^{m}$, respective second offsets of the second start positions of respective channel regions with respect to the third start position, for example, determining that $\Delta_m = N_{eCCE}^{m} + \Delta_{m-1}$ where m denotes the serial number of a downlink subframe, for example, 1, 2, 3 ..., $\Delta_0=0$. Since the second start position of the downlink subframe 1 overlaps with the third start position of the channel resource for feeding back HARQ, the second offset $\Delta_0$ of the downlink subframe 1 is 0, while the second offset $\Delta_1$ of the downlink subframe 2 is $N_{eCCE}^{1}$; similarly, if in the above example, one uplink subframe corresponds to three downlink subframes and the channel resource(s) is divided into three channel regions, the second offset of the downlink subframe 3 is $\Delta_2 = N_{eCCE}^{1} + N_{eCCE}^{2}$.

It should be noted that the above example is only for better illustrating the technical solution of the present invention, not intended to limit the present invention. Those skilled in the art should understand that any implementation manner of determining, based on the information provided by the base station, when each of channel region has a one-to-one correspondence with one of the downlink subframes, the number of eCCEs included in one downlink, regarding each channel region as the one including the lowest eCCE index number, and determining, based on the number of eCCEs, respective second offsets of the second start positions of respective channel regions with respect to the third start position of the channel resource(s) for feeding back HARQ, should be included in the scope of the present invention.

ii) the eCCEs of each downlink subframe are divided into N groups, each channel region corresponds to one group of eCCEs, and multiple groups of eCCEs of each downlink subframe are distributed in an interleaved mode, wherein N is a parameter, then the user equipment, based on the information provided by the base station, determines the number $N_p^{m}$ of the enhanced control channel elements included in the first p groups of eCCEs of one downlink subframe, wherein $0 \leq p \leq N-1$, m denotes the serial number of downlink subframe and $1 \leq m \leq M$, M denotes the highest number of downlink subframes.

For example, refer to FIG. 4a. The eCCEs of each downlink subframe are divided into three groups (i.e., N=3), and one uplink subframe corresponds to two downlink subframes; then the divided channel regions are six, which six channel regions correspond to one group of eCCEs, respectively, and the multiple groups of eCCEs of respective downlink subframes are distributed in an interleaved mode. As shown in FIG. 4a, the six channel regions correspond to, in an order from left to right, the first group of eCCEs of downlink subframe 1, the first group of eCCEs of downlink subframe 2, the second group of eCCEs of downlink subframe 1, the second group of eCCEs of downlink subframe 2, the third group of eCCEs of downlink subframe 1, and the third group of eCCEs of downlink subframe 2. If the information provided by the base station directly contains the number $N_{eCCE}^{m}$ of all eCCEs included in one downlink subframe, then the user equipment directly derives the $N_{eCCE}^{m}$ from the information provided by the base station; if the information provided by the base station includes the number information $N_m$ of PRB pairs included in one downlink subframe, then the user equipment needs to determine $N_{eCCE}^{m}=N_m \times N_{eCCE}$ in consideration of $N_m$ and the number $N_{eCCE}$ of eCCEs included in each PRB pair as derived based on the standard. Then, the number of enhanced control channel elements included in the first p groups of eCCEs of one downlink subframe is $$N_p^m = \max\left\{0, \left\lfloor \frac{N_{eCCE}^m}{N} \times p \right\rfloor\right\},$$

where p=0 indicates no eCCE groups, and in this case, $N_{p=0}^{m}$.

Next, in the present implementation, the user equipment causes p to vary within 0~N−1, and compares the number $N_p^{m}$ of the eCCEs included in the first p groups of eCCEs and the number $N_{p+1}^{m}$ of the eCCEs included in the first p+1 groups of ECCEs of each downlink subframe with the third offset $n_{eCCE}^{m}$ starting from the third start position $P_{PUCCH}^{(1)}$, till $N_p^{m} \leq n_{eCCE}^{m} < N_{p+1}^{m}$, then determines that the channel region corresponding to the pth group of enhanced control channel elements of each downlink subframe as the channel region including the lowest enhanced control channel element identification, and determines the respective second offsets Δ based on the following equation, $$\Delta = p \times \sum_{l=1}^{M} \left\lfloor \frac{N_{eCCE}^l}{N} \right\rfloor + \sum_{l=1}^{m-1} \left\lfloor \frac{N_{eCCE}^l}{N} \right\rfloor,$$

wherein $N_{eCCE}^{m}$ is the number of all eCCEs included in the downlink subframe m, $1 \leq l \leq M$, $$\sum_{l=1}^{0} \left\lfloor \frac{N_{eCCE}^l}{N} \right\rfloor = 0.$$

For example, continue the above example. Continue reference to FIG. 4a. The user equipment, through manners such as blind detection, determines the third offset $n_{eCCE}^m$ starting from the third start position $N_{PUCCH}^{(1)}$ of the channel resource(s) in the channel resource(s) for feeding back HARQ in the case of the user equipment adopting OTO. Then for the downlink subframe 1 (i.e., m=1), the user equipment calculates whether $N_p^m \leq n_{eCCE}^m < N_{p+1}^m$ stands when p=0. If it stands, then for the downlink subframe 1, its channel region corresponding to the first group of eCCEs is the one including the lowest eCCE index number; if it does not stand, then lets p+1, calculates whether $N_p^m \leq n_{eCCE}^m < N_{p+1}^m$ stands in case of p=1, and so forth, till $N_p^m \leq n_{eCCE}^m < N_{p+1}^m$ stands, then determines that the channel region corresponding to the p+1$^{st}$ group of eCCEs of the downlink subframe 1 is the channel region including an eCCE index number, and calculates the second offset Δ based on the equation $$p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor,$$

wherein when m=1, $$\sum_{l=1}^{m-1} \left\lfloor \frac{N_{eCCE}^m}{N} \right\rfloor.$$

For the downlink subframe 2, its second offset Δ may be determined similarly adopting the above manner, wherein the second offset Δ actually reflects the sum of the number of eCCEs of all eCCEs groups before the p+1$^{st}$ group of eCCEs; for example, continue to refer to FIG. 4a, if m=2 (indicating the downlink subframe 2) and p=1 (indicating that the lowest eCCE index number of the downlink subframe 2 is included in the channel region corresponding to its second group of eCCEs), then $$p \times \sum_{l=1}^{M} \left\lfloor \frac{N_{eCCE}^m}{N} \right\rfloor$$

indicates the sum of the number of eCCEs in the first group of eCCEs of the downlink subframe 1 and the first group of eCCEs of the downlink subframe 2, and $$\sum_{l=1}^{m-1} \left\lfloor \frac{N_{eCCE}^m}{N} \right\rfloor$$

indicates the number of the eCCEs in the second group of eCCEs of the downlink subframe 1. Here, during the process of determining whether $N_p^m \leq n_{eCCE}^m < N_{p+1}^m$ stands, p may be decremented to 1 from N gradually, or even randomly selecting a non-repetitive p between 1 and N.

It should be noted that the above example is only for better illustrating the technical solution of the present invention, not intended to limit the present invention. Those skilled in the art should understand, any implementation manner of determining the second offset through the above ii) manner should be included within the scope of the present invention.

Next, in step S22, the user equipment obtains the plurality of device channel resources occupied by the user equipment in the channel resources for feeding back HARQ by summing respective second offsets of respective subframes to a third start position and a third offset $n_{eCCE}^m$ starting from the third start position $N_{PUCCH}^1$, respectively, wherein the third start position $N_{PUCCH}^1$ is provided by the base station, and the third offset $n_{eCCE}^m$ is determined by the present user equipment through blind detection, for example, acquiring its own downlink control signaling through blind detecting the ePDCCH, as well as the lowest eCCE (first eCCE) index number bearing the downlink control signaling, i.e., $n_{eCCE}^m$.

Specifically, the manners in which the user equipment obtains the plurality of device channel resources, include, but not limited to:

1) by summing respective offset and the third start position $N_{PUCCH}^1$ and the third offset $n_{eCCE}^m$, respectively, the user equipment obtains the plurality of device channel resources occupied by the present user equipment in the channel resources.

For example, in the embodiment with reference to FIG. 4b, each device channel resource $n_{PUCCH}^1$ may be determined based on the equation $n_{PUCCH}^1 = \Delta_m + n_{eCCE}^m + N_{PUCCH}^{(1)}$.

2) by summing respective second offset Δ and the third start position and the third offset while minus the number $N_p^m$ of the enhanced control channel elements, respectively, the user equipment obtains the plurality of device channel resources occupied by the present user equipment in the channel resources.

For example, in the embodiment with reference to FIG. 4a, each device channel resource $n_{PUCCH}^1$ may be determined based on the equation $$n_{PUCCH}^1 = p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor + (n_{eCCE}^m - N_p^m) + N_{PUCCH}^1.$$

Here, the number of device channel resources $n_{PUCCH}^1$ should be equal to the number of downlink subframes of the user equipment currently corresponding to one uplink subframe, i.e., for each downlink subframe, the user equipment can determine a device channel resource to feed back the HARQ of the downlink subframe.

It should be noted that the above example is only for better illustrating the technical solution of the present invention, not intended to limit the present invention. Those skilled in the art should understand, any implementation manner of obtaining the plurality of device channel resources occupied by the present user equipment in the channel resources for feeding back HARQ by summing respective second offsets of respective subframes and the third start position and the third offset starting from the third start position, respectively, should be included within the scope of the present invention.

The present invention enables a user equipment to feed back the HARQ of the PDSCH as scheduled for the ePDCCH; further, the present invention re-allocates the PUCCH resource(s), such that the user equipment can obtain the device channel resource(s) for feeding back the HARQ from within the PUCCH; preferably, by providing the number of PRB pairs to the user equipment or directly providing the number of eCCEs of a downlink subframe via the base station, the lowest eCCE index plus offset can be suitable for the TDD system, which avoids the conflict issue caused by directly using the lowest eCCE index number plus offset by the TDD system in the prior art, and reduces resource waste; more preferably, for channel resource(s) for feeding back HARQ, the present invention can also adopt an interleaved mode for resource allocation.

The apparatus for implementing the following solution is included in the user equipment. The apparatus comprises an acquiring module configured to perform the following operations:

obtaining device channel resource(s) occupied by the present user equipment in at least one channel region of the plurality of channel regions divided from channel resource(s) for feeding back HARQ.

Figure 7:
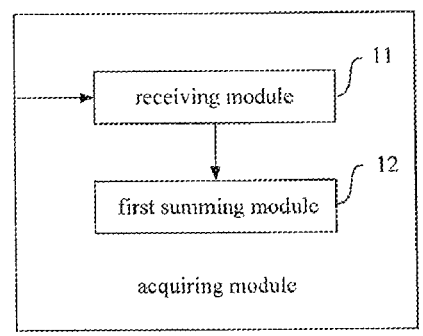
FIG. 7 shows a structural diagram of an acquiring apparatus for determining device channel resource(s) occupied by a user equipment in at least one channel region of a plurality of channel regions that are divided from channel resources for feeding back HARQ according to one preferred embodiment of the present invention.
Figure 8:
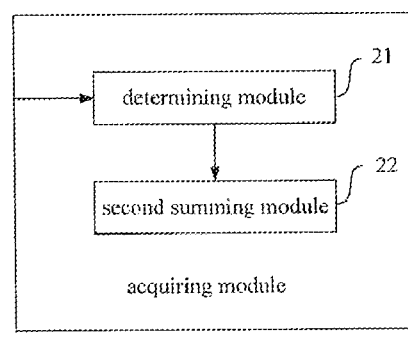
FIG. 8 shows a structural diagram of an acquiring apparatus for determining device channel resource(s) occupied by a user equipment in at least one channel region of a plurality of channel regions that are divided from channel resources for feeding back HARQ according to another preferred embodiment of the present invention.

Specifically, the acquiring module may adopt a plurality of manners to obtain the device channel resource(s) occupied by the present user equipment in at least one channel region of the plurality of channel regions divided from channel resource(s) for feeding back HARQ, which will be further explained infra with reference to FIGS. 7 and 8.

Refer to FIG. 7. In one preferred embodiment, the channel resource(s) for feeding back HARQ is divided into a plurality of channel regions based on the highest number of downlink subframes, and the different channel regions divided from the channel resource(s) for feeding back HARQ are allocated to user equipments adopting a different number of downlink subframes. Then, in this embodiment, the user equipment only occupies the device channel resource(s) in one channel region at one time point. The acquiring module in the present embodiment comprises a receiving module 11 and a first summing module 12.

The receiving module 11 receives a first start position of the channel region provided by the base station while used by the present user equipment; wherein the used channel region may be determined by a base station, for example, eNB, based on the potential highest number of downlink subframes having the enhanced physical downlink control channel set thereon, wherein the first start position of the channel region is determined by the base station and provided to the user equipment.

For example, refer to FIG. 4c. The channel resource(s) for feeding back HARQ is divided into two channel regions based on the highest number of downlink subframes with the enhanced physical downlink control channel thereon being two, wherein the channel region without shading is allocated to a user equipment adopting OTO, while the channel region indicated by oblique shading is allocated to the user equipment adopting a one uplink subframe to two downlink subframes in OTM; if the present user equipment adopts OTO, then the present user equipment currently uses the channel region without shading, and the base station provides the first start position $N^{(1)}_{PUCCH,OTO}$, which is already configured by the said base station, of the channel region without shading to the present user equipment, and received by the receiving module 11; if the present user equipment currently adopts OTM, then the present user equipment currently uses the channel region indicated by oblique shading, and the base station provides the first start position $N^{(1)}_{PUCCH,OTM}$ of the channel region indicated by oblique shading as already configured by the said base station to the present user equipment, and received by the receiving module 11.

It should be noted that the above example is only for better illustrating the technical solution of the present invention, not intended to limit the present invention. Those skilled in the art should understand that any implementation manner of receiving a first start position of the channel region used by the present user equipment as provided by the base station should be included within the scope of the present invention.

The first summing module 12 obtains the device channel resource(s) occupied by the present user equipment in the used channel region by the first start position plus a first offset of the present user equipment in the used channel region, wherein the first offset is determined by the present user equipment through blind detection. For example, the user equipment blind detects the lowest eCCE index number in its subframe so as to determine its first offset $n_{eCCE}$ and the like in its used channel region.

Please refer to 4c. If the user equipment adopts OTO, then the start of the device channel resource(s) occupied by the user equipment in the used channel region without shading is $n_{PUCCH}^1 = n_{eCCE} + N_{PUCCH,OTO}^{(1)}$; if the user equipment adopts OTM, then the start of the device channel resource(s) occupied by the user equipment in the used channel region indicated by oblique shading is $n_{PUCCH}^1 = n_{eCCE} + N_{PUCCH,OTM}^{(1)}$. Thus, the user equipment can determine the device channel resource(s) occupied by itself in the used channel region indicated by oblique shading.

It should be noted that the above example is only for better illustrating the technical solution of the present invention, not intended to limit the present invention. Those skilled in the art should understand that any implementation manner of determining the device channel resource(s) occupied by the present user equipment in the used channel region by the first start position plus a first offset of the present user equipment in the used channel region should be included within the protection scope of the present invention.

It should be further noted that the receiving module 11 may receive each first start position in OTO and each OTM together as configured by the base station, for example, configured through signaling, then the first summing module 12 selects the corresponding first start position based on the currently adopted OTO or OTM.

Refer to FIG. 8. As one preferred embodiment, the channel resource(s) for feeding back HARQ is divided into a plurality of channel regions based on the current number of downlink subframes corresponding to one uplink subframe in the user equipment, and one channel region is allocated to perform feedback for one downlink subframe.

Here, the scenario in which one channel region is allocated to perform feedback for one downlink subframe may comprise:

1) each of the channel regions has a one-to-one correspondence with one of the downlink subframes, as shown in FIG. 4b;

2) the enhanced control channel elements of each downlink subframe are divided into N groups, each channel region corresponds to a group of enhanced control channel elements, and the multiple of groups of enhanced control channel elements of respective downlink subframes are distributed in an interleaved mode, as shown in FIG. 4a.

The acquiring module in the present embodiment comprises a determining module 21 and a second summing module 22.

The determining module 21, based on the information provided by the base station, determines respective second offsets of respective second start positions of channel regions, which including respective lowest eCCE index numbers, with respect to a third start position of the channel resource(s) for feeding back HARQ.

Here, the information provided by the base station may include, but not limited to, at least one of the following items:
1) information about the number of downlink physical resource block (PRB) pairs as included in one downlink subframe and allocated to the enhanced physical downlink control channel;
2) the number of all eCCEs included in one downlink subframe.

Preferably, the information provided by the base station may further comprise information of downlink subframe having ePDCCH set thereon, so as to be available for the user equipment to determine the downlink subframe having ePDCCH set thereon.

Specifically, the manners in which the determining module 21, based on the information provided by the base station, determines respective second offsets of respective second start positions of channel regions including respective lowest eCCE index numbers with respect to a third start position of the channel resource(s), include, but not limited to:

i) each of the channel region has an one-to-one correspondence with one of the downlink subframe; and the determining module 21 comprises a first sub-determining module (not shown) and a second sub-determining module (not shown). The first sub-determining module, the user equipment, based on the information provided by the base station, determines the number of eCCEs included in one ePDCCH subframe, and the second sub-determining module takes each channel region as the one including the lowest eCCE index number, and determines, based on the number of eCCEs, respective second offsets of the second start positions of respective channel regions with respect to a third start position $N_{PUCCH}^{(1)}$ of the channel resource(s) for feeding back HARQ. Preferably, the third start position $N_{PUCCH}^{(1)}$ is a reference value that should be used in the case of scheduling, in the ePDCCH, an eCCE for the present user equipment, when determining the device channel resource(s) for sending the HARQ feedback of the PDSCH corresponding to the present user equipment.

For example, refer to FIG. 4b. The channel regions without shading and those indicated by oblique shading have a one-to-one correspondence with the downlink subframe 1 and the downlink subframe 2, respectively. If the information provided by the base station directly contains the number $N_{eCCE}^{m}$ of all eCCEs included in one downlink subframe, the first sub-determining module directly derives the $N_{eCCE}^{m}$ from the information provided by the base station; if the information provided by the base station includes PRB pair number information $N_m$ included in one downlink subframe, then the first sub-determining module needs to determine $N_{eCCE}^{m}=N_m \times N_{eCCE}$ in consideration of $N_m$ and the eCCE number $N_{eCCE}$ included in each PRB as derived based on the standard.

Next, since the channel regions and downlink subframes have a one-to-one correspondence and each subframe should have a lowest eCCE index number, the second sub-determining module may regard each channel region as the one including the lowest eCCE index number, and determines, based on $N_{eCCE}^{m}$, respective second offsets of the second start positions of respective channel regions with respect to the third start position, for example, determining that $\Delta_m = N_{eCCE}^{m} + \Delta_{m-1}$, where m denotes the serial number of a downlink subframe, for example, 1, 2, 3 ..., $\Delta_0=0$.

Since the second start position of the downlink subframe 1 overlaps with the third start position of the channel resource for feeding back HARQ, the second offset $\Delta_0$ of the downlink subframe 1 is 0, while the second offset $\Delta_1$ of the downlink subframe 2 is $N_{eCCE}^{1}$; similarly, if in the above example, one uplink subframe corresponds to three downlink subframes and the channel resource(s) is divided into three channel regions, the second offset of the downlink subframe 3 is $\Delta_2 = N_{eCCE}^{1} + N_{eCCE}^{2}$.

It should be noted that the above example is only for better illustrating the technical solution of the present invention, not intended to limit the present invention. Those skilled in the art should understand that any implementation manner of determining, based on the information provided by the base station, when each of channel region has a one-to-one correspondence with one of the downlink subframes, the number of eCCEs included in one downlink, regarding each channel region as the one including the lowest eCCE index number, and determining, based on the number of eCCEs, respective second offsets of the second start positions of respective channel regions with respect to the third start position of the channel resource(s) for feeding back HARQ, should be included in the scope of the present invention.

ii) the eCCEs of each downlink subframe are divided into N groups, each channel region corresponds to one group of eCCEs, and multiple groups of eCCEs of each downlink subframe are distributed in an interleaved mode, wherein N is a parameter. The acquiring module comprises a third sub-determining module (not shown) and a fourth sub-determining module (not shown). Then, the third sub-determining module, based on the information provided by the base station, determines the number $N_p^{m}$ of the enhanced control channel elements included in the first p groups of eCCEs of one downlink subframe, wherein $0 \leq p \leq N-1$, m denotes the serial number of downlink subframe and $1 \leq m \leq M$, M denotes the highest number of downlink subframes.

For example, refer to FIG. 4a. The eCCEs of each downlink subframe are divided into three groups (i.e., N=3), and one uplink subframe corresponds to two downlink subframes; then the divided channel regions are six, which six channel regions correspond to one group of eCCEs, respectively, and the multiple groups of eCCEs of respective downlink subframes are distributed in an interleaved mode. As shown in FIG. 4a, the six channel regions correspond to, in an order from left to right, the first group of eCCEs of downlink subframe 1, the first group of eCCEs of downlink subframe 2, the second group of eCCEs of downlink subframe 1, the second group of eCCEs of downlink subframe 2, the third group of eCCEs of downlink subframe 1, and the third group of eCCEs of downlink subframe 2. If the information provided by the base station directly contains the number $N_{eCCE}^{m}$ of all eCCEs included in one downlink subframe, then the third sub-determining module directly derives the $N_{eCCE}^{m}$ from the information provided by the base station; if the information provided by the base station includes the number information $N_m$ of PRB pairs included in one downlink subframe, then the third sub-determining module needs to determine $N_{eCCE}^{m}=N_m \times N_{eCCE}$ in consideration of $N_m$ and the number $N_{eCCE}$ of eCCEs included in each PRB pair as derived based on the standard. Then, the number of enhanced control channel elements included in the first p groups of eCCEs of one downlink subframe is $$N_p^m = \max\left\{0, \left\lfloor \frac{N_{eCCE}^m}{N} \times p \right\rfloor\right\},$$

where p=0 indicates no eCCE groups, and in this case, $N_{p=0}{}^m$.

Next, in the present implementation, the fourth sub-determining module causes p to vary within 0~N−1, and compares the number $N_p{}^m$ of the eCCEs included in the first p groups of eCCEs and the number $N_{p+1}{}^m$ of the eCCEs included in the first p+1 groups of ECCEs of each downlink subframe with the third offset $n_{eCCE}{}^m$ starting from the third start position $N_{PUCCH}{}^{(1)}$, till $N_p{}^m \leq n_{eCCE}{}^m < N_{p+1}{}^m$, then determines that the channel region corresponding to the pth group of enhanced control channel elements of each downlink subframe as the channel region including the lowest enhanced control channel element identification, and determines the respective second offsets Δ based on the following equation, $$\Delta = p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor,$$

wherein $N_{eCCE}{}^m$ is the number of all eCCEs included in the downlink subframe m, 1≤l≤M, $$\sum_{l=1}^{0} \left\lfloor \frac{N_{eCCE}^m}{N} \right\rfloor = 0.$$

For example, continue the above example. Continue reference to FIG. 4a. The user equipment, through manners such as blind detection, determines the third offset $n_{eCCE}$ starting from the third start position $N_{PUCCH}{}^{(1)}$ of the channel resource(s) in the channel resource(s) for feeding back HARQ in the case of the user equipment adopting OTO. Then for the downlink subframe 1 (i.e., m=1), the fourth sub determining module calculates whether $N_p{}^m \leq n_{eCCE}{}^m < N_{p+1}{}^m$ stands when p=0. If it stands, then for the downlink subframe 1, its channel region corresponding to the first group of eCCEs is the one including the lowest eCCE index number; if it does not stand, then lets p+1, calculates whether $N_p{}^m \leq n_{eCCE}{}^m < N_{p+1}{}^m$ stands in case of p=1, and so forth, till $N_p{}^m \leq n_{eCCE}{}^m < N_{p+1}{}^m$ stands, then determines that the channel region corresponding to the p+1$^{st}$ group of eCCEs of the downlink subframe 1 is the channel region including an eCCE index number, and calculates the second offset Δ based on the equation $$p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor,$$

wherein when m=1, $$\sum_{l=1}^{m-1} \left\lfloor \frac{N_{eCCE}^m}{N} \right\rfloor.$$

For the downlink subframe 2, its second offset Δ may be determined similarly adopting the above manner, wherein the second offset Δ actually reflects the sum of the number of eCCEs of all eCCEs groups before the p+1$^{st}$ group of eCCEs; for example, continue to refer to FIG. 4a, if m=2 (indicating the downlink subframe 2) and p=1 (indicating that the lowest eCCE index number of the downlink subframe 2 is included in the channel region corresponding to its second group of eCCEs), then $$p \times \sum_{l=1}^{M} \left\lfloor \frac{N_{eCCE}^m}{N} \right\rfloor$$

indicates the sum of the number of eCCEs in the first group of eCCEs of the downlink subframe 1 and the first group of eCCEs of the downlink subframe 2, and $$\sum_{l=1}^{m-1} \left\lfloor \frac{N_{eCCE}^m}{N} \right\rfloor$$

indicates the number of the eCCEs in the second group of eCCEs of the downlink subframe 1. Here, during the process of determining whether $N_p{}^m \leq n_{eCCE}{}^m < N_{p+1}{}^m$ stands, p may be decremented to 1 from N gradually, or even randomly selecting a non-repetitive p between 1 and N.

It should be noted that the above example is only for better illustrating the technical solution of the present invention, not intended to limit the present invention. Those skilled in the art should understand, any implementation manner of determining the second offset through the above ii) manner should be included within the scope of the present invention.

Next, the second summing module 22 obtains the plurality of device channel resources occupied by the user equipment in the channel resources for feeding back HARQ by summing respective second offsets of respective subframes to a third start position and a third offset $n_{eCCE}$ starting from the third start position $N_{PUCCH}{}^1$ respectively, wherein the third start position $N_{PUCCH}{}^1$ is provided by the base station, and the third offset $n_{eCCE}{}^m$ is determined by the present user equipment through blind detection, for example, acquiring its own downlink control signaling through blind detecting the ePDCCH, as well as the lowest eCCE (first eCCE) index number bearing the downlink control signaling, i.e., $n_{eCCE}{}^m$.

Specifically, the manners in which the second summing module 22 obtains the plurality of device channel resources, include, but not limited to:

1) the second summing module 22 comprises a first sub-summing module (not shown), the first summing module sums respective second offset and the third start position $N_{PUCCH}{}^1$ and the third offset $n_{eCCE}{}^m$, respectively, to obtain the plurality of device channel resources occupied by the present user equipment in the channel resources.

For example, in the embodiment with reference to FIG. 4b, each device channel resource $n_{PUCCH}{}^1$ may be determined based on the equation $n_{PUCCH}{}^1 = \Delta_m + n_{eCCE}{}^m + N_{PUCCH}{}^{(1)}$.

2) the second summing module 22 comprises a second sub-suming module (not shown). The second sub-summing module sums respective second offset Δ and the third start position and the third offset while minus the number $N_p{}^m$ of the enhanced control channel elements, respectively, to obtain the plurality of device channel resources occupied by the present user equipment in the channel resources.

For another example, in the embodiment with reference to FIG. 4a, each device channel resource $n_{PUCCH}{}^1$ may be determined based on the equation $$n_{PUCCH}^1 = p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor + (n_{eCCE}^m - N_p^m) + N_{PUCCH}^1.$$

Here, the number of device channel resources $n_{PUCCH}^1$ should be equal to the number of downlink subframes of the user equipment currently corresponding to one uplink subframe, i.e., for each downlink subframe, the user equipment can determine a device channel resource to feed back the HARQ of the downlink subframe.

It should be noted that the above example is only for better illustrating the technical solution of the present invention, not intended to limit the present invention. Those skilled in the art should understand, any implementation manner of obtaining the plurality of device channel resources occupied by the present user equipment in the channel resources for feeding back HARQ by summing respective second offsets of respective subframes and the third start position and the third offset starting from the third start position, respectively, should be included within the scope of the present invention.

The present invention enables a user equipment to feed back the HARQ of the PDSCH as scheduled for the ePDCCH; further, the present invention re-allocates the PUCCH resource(s), such that the user equipment can obtain the device channel resource(s) for feeding back the HARQ from within the PUCCH; preferably, by providing the number of PRB pairs to the user equipment or directly providing the number of eCCEs of a downlink subframe via the base station, the lowest eCCE index plus offset can be suitable for the TDD system, which avoids the conflict issue caused by directly using the lowest eCCE index number plus offset by the TDD system in the prior art, and reduces resource waste; more preferably, for channel resource(s) for feeding back HARQ, the present invention can also adopt an interleaved mode for resource allocation.

It needs to note that the present invention can be implemented in software and/or a combination of software and hardware, for example, the invention can be implemented by using an Application Specific Integrated Circuit (ASIC), a general purpose computer or any other similar hardware equipment. In one embodiment, the software program of this invention can be executed by a processor to accomplish the aforesaid steps or functions. Likewise, the software program (including the relevant data structure) of the invention can be stored in a computer readable recording medium, for example, RAM memory, magneto-optical drive or floppy disk and similar devices. In addition, some steps or functions of the invention can be realized by using hardware, for example, a circuit that cooperates with the processor to perform various steps or functions.

To those skilled in the art, apparently the present invention is not limited to the details of the aforementioned exemplary embodiments, moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

The invention claimed is:

1. A method, in a user equipment of a TDD system, for determining device channel resource(s) of the present user equipment, wherein the TDD system performs resource scheduling of the user equipment using an enhanced physical downlink control channel, and a physical uplink control channel used includes channel resource(s) for feeding back a hybrid automatic repeat request of a physical downlink shared channel as scheduled by the enhanced physical downlink control channel, wherein the number of downlink subframes as fed back in one uplink subframe may be more than one, the channel resource(s) being divided into a plurality of channel regions based on the number of downlink subframes having the enhanced physical downlink control channel set thereon currently, or based on the potential highest number of downlink subframes having the enhanced physical downlink control channel set thereon, the method comprising:
obtaining the device channel resource(s) occupied by the present user equipment in at least one channel region of the plurality of channel regions,
wherein the channel resource(s) is divided into a plurality of channel regions based on the highest number of downlink subframes, with different channel regions being allocated to user equipment adopting the different number of downlink subframes, the obtaining comprising receiving a first start position of the channel region used by the present user equipment as provided by a base station, wherein the used channel region is determined based on the highest number of downlink subframes, and summing a first offset of the present user equipment in the used channel region and the first start position to obtain the device channel resource(s) occupied by the present user equipment in the used channel region, wherein the first offset is determined by the present user equipment through blind detection; and
using the obtained device channel resources for feeding back HARQ.

2. The method according to claim 1, wherein the channel resource(s) is divided into a plurality of channel regions based on the number of downlink subframes configured with the enhanced physical downlink control channel, one channel region is allocated to perform feedback to one downlink subframe, the obtaining comprising:
determining, based on information provided by the base station, respective second offsets of second start positions of channel regions, which include respective lowest enhanced control channel element identifications, with respect to a third start position of the channel resource(s), the information provided by the base station including at least one of the following: information about the number of PRB pairs included in one downlink subframe and allocated to the enhanced physical downlink control channel, and the number of enhanced control channel elements included in one downlink subframe;
obtaining the plurality of device channel resources occupied by the present user equipment in the channel resources based on the respective second offsets, the third start position and a third offset of the present user equipment starting from the third start position, wherein the third start position is provided by the base station, and the third offset is determined by the present user equipment through blind detection.

3. The method according to claim 2, wherein each of the channel regions has a one-to-one correspondence with one of the downlink subframes, the determining comprising:
   determining, based on the information provided by the base station, the number of enhanced control channel elements included in an enhanced downlink control channel;
   taking each channel region as a channel region including the lowest enhanced control channel element identification, and determining, based on the number of the enhanced control channel elements, respective second offsets of the second start positions of respective channel regions with respect to the third start position;
   wherein the obtaining comprises:
   summing the respective second offset and the third start position and the third offset, respectively, to obtain the plurality of device channel resources occupied by the present user equipment in the channel resources.

4. The method according to claim 1, wherein the number of downlink subframes as fed back in one uplink subframe is at least 2.

5. A method, in a user equipment of a TDD system, for determining device channel resource(s) of the present user equipment, wherein the TDD system performs resource scheduling of the user equipment using an enhanced physical downlink control channel, and a physical uplink control channel used includes channel resource(s) for feeding back a hybrid automatic repeat request of a physical downlink shared channel as scheduled by the enhanced physical downlink control channel, wherein the number of downlink subframes as fed back in one uplink subframe may be more than one, the channel resource(s) being divided into a plurality of channel regions based on the number of downlink subframes having the enhanced physical downlink control channel set thereon currently, or based on the potential highest number of downlink subframes having the enhanced physical downlink control channel set thereon, the method comprising:
   obtaining the device channel resource(s) occupied by the present user equipment in at least one channel region of the plurality of channel regions,
   wherein the channel resource(s) is divided into a plurality of channel regions based on the highest number of downlink subframes, configured with the enhanced physical downlink control channel, one channel region is allocated to perform feedback to one downlink subframe, with different channel regions being allocated to user equipment adopting the different number of downlink subframes, the obtaining comprising:
   receiving a first start position of the channel region used by the present user equipment as provided by a base station, wherein the used channel region is determined based on the highest number of downlink subframes, and summing a first offset of the present user equipment in the used channel region and the first start position to obtain the device channel resource(s) occupied by the present user equipment in the used channel region, wherein the first offset is determined by the present user equipment through blind detection; and
   determining, based on information provided by the base station, respective second offsets of second start positions of channel regions, which include respective lowest enhanced control channel element identifications, with respect to a third start position of the channel resource(s), the information provided by the base station including at least one of the following:
   information about the number of PRB pairs included in one downlink subframe and allocated to the enhanced physical downlink control channel, and the number of enhanced control channel elements included in one downlink subframe, the enhanced control channel elements of each downlink subframe are divided into N groups, each channel region corresponds to one group of enhanced control channel elements, and a plurality of groups of enhanced control channel elements of the plurality of downlink subframes are distributed with an interleaved mode, N is a parameter, the determining comprising
   determining the number $N_p^m$ of enhanced control channel elements included in the first p groups of enhanced control channel elements of a downlink subframe based on the information provided by the base station, wherein $0 \leq p \leq N-1$, m represents the serial number of the downlink subframe, and $1 \leq m \leq M$ is the highest number of downlink subframes;
   causing p to vary in a range from 0 to N−1, and comparing the number $N_p^m$ of the enhanced control channel elements included in the first p groups of enhanced control channel elements of respective downlink subframes and the number $N_{p+1}^m$ of the enhanced control channel elements included in the first p+1 groups of enhanced control channel elements with the third offset $n_{eCCE}^m$, respectively, till $N_p^m \leq n_{eCCE}^m < N_{p+1}^m$, then determining that the channel region corresponding to the p+1 group of enhanced control channel elements of each downlink subframe is the channel region that includes the lowest enhanced control channel element identification, and determining respective second offsets Δ according to the following equation:

$$\Delta = p \times \sum_{l=1}^{M} \left\lfloor \frac{N_{eCCE}^m}{N} \right\rfloor + \sum_{l=1}^{m-1} \left\lfloor \frac{n_{eCCE}^m}{N} \right\rfloor;$$

wherein, $N_{eCCE}^m$ is the number of enhanced control channel elements included in the downlink subframe m, $1 \leq l \leq M$, $$\sum_{l=1}^{0} \left\lfloor \frac{N_{eCCE}^m}{N} \right\rfloor = 0;$$

wherein, the obtaining comprises:
   the respective second offset Δ, the third start position, and the third offset being summed, and the number $N_p^m$ of the enhanced control channel elements being subtracted from the sum to obtain the plurality of device channel resources occupied by the present user equipment in the channel resources;
   obtaining the plurality of device channel resources occupied by the present user equipment in the channel resources based on the respective second offsets, the third start position and a third offset of the present user equipment starting from the third start position, wherein the third start position is provided by the base station, and the third offset is determined by the present user equipment through blind detection using the obtained device channel resources for feeding back HARQ.

6. An apparatus, in a user equipment of a TDD system, for determining device channel resource(s) of the present user equipment, wherein the TDD system performs resource scheduling to the user equipment using an enhanced physical downlink control channel, and a physical uplink control channel as used includes channel resource(s) for feeding back a hybrid automatic repeat request of a physical downlink shared channel as scheduled by the enhanced physical downlink control channel, when the number of downlink subframes as fed back in one uplink subframe may be more than one, the channel resource(s) is divided into a plurality of channel regions based on the number of downlink subframes having the enhanced physical downlink control channel set thereon currently, or based on the potential highest number of downlink subframes having the enhanced physical downlink control channel set thereon, the apparatus comprising:
an acquiring module configured to obtain the device channel resource(s) occupied by the present user equipment in at least one channel region of the plurality of channel regions, wherein the channel resource(s) is divided into a plurality of channel regions based on the highest number of downlink subframes, with different channel region being allocated to user equipment adopting the different number of downlink subframes, the acquiring module comprises:
a receiving module configured to receive a first start position of the channel region used by the present user equipment as provided by a base station, wherein the used channel region is determined based on the highest number of downlink subframes; and
a first summing module configured to sum the first start position and a first offset of the present user equipment in the used channel region to obtain the device channel resource(s) occupied by the present user equipment in the used channel region, wherein the first offset is determined by the present user equipment through blind detection;
wherein the obtained device channel resources are used for feeding back HARQ.

7. The apparatus according to claim 6, wherein the channel resource(s) is divided into a plurality of channel regions based on the number of downlink subframes configured with the enhanced physical downlink control channel, one channel region is allocated to perform feedback to one downlink subframe, the acquiring module comprises:
a determining module configured to determine, based on information provided by the base station, respective second offsets of second start positions of channel regions, which including respective lowest enhanced control channel element identifications, with respect to a third start position of the channel resource(s), wherein the information provided by the base station-includes at least one of the following, information about the number of PRB pairs included in one downlink subframe and allocated to the enhanced physical downlink control channel, and the number of enhanced control channel elements included in one downlink subframe;
a second summing module configured to obtain the plurality of device channel resources occupied by the present user equipment in the channel resources based on the respective second offsets, the third start position and a third offset of the present user equipment starting from the third start position, wherein the third start position is provided by the base station, and the third offset is determined by the present user equipment through blind detection.

8. The apparatus according to claim 7, wherein each of the channel regions has a one-to-one correspondence with one of the downlink subframes, the determining module comprises:
a first sub-determining module configured to determine, based on the information provided by the base station, the number of enhanced control channel elements included in an enhanced downlink control channel;
a second sub-determining module configured to regard each channel region as a channel region including the lowest enhanced control channel element identification, and determine, based on the number of the enhanced control channel elements, respective second offsets of the second start positions of respective channel regions with respect to the third start position;
wherein the second summing module comprises:
a first sub-summing module configured to sum the respective second offsets and the third start position and the third offset, respectively, to obtain plurality of device channel resources occupied by the present user equipment in the channel resources.

9. The apparatus according to claim 6, wherein the number of downlink subframes as fed back in one uplink subframe is at least 2.

10. A user equipment, comprising the apparatus according to claim 6.

11. An apparatus, in a user equipment of a TDD system, for determining device channel resource(s) of the present user equipment, the device channel resource(s) is divided into a plurality of channel regions based on the number of downlink subframes configured with the enhanced physical downlink control channel, one channel region is allocated to perform feedback to one downlink subframe, wherein the TDD system performs resource scheduling to the user equipment using an enhanced physical downlink control channel, and a physical uplink control channel as used includes channel resource(s) for feeding back a hybrid automatic repeat request of a physical downlink shared channel as scheduled by the enhanced physical downlink control channel, when the number of downlink subframes as fed back in one uplink subframe may be more than one, the channel resource(s) is divided into a plurality of channel regions based on the number of downlink subframes having the enhanced physical downlink control channel set thereon currently, or based on the potential highest number of downlink subframes having the enhanced physical downlink control channel set thereon, the apparatus comprising:
an acquiring module configured to obtain the device channel resource(s) occupied by the present user equipment in at least one channel region of the plurality of channel regions, wherein the channel resource(s) is divided into a plurality of channel regions based on the highest number of downlink subframes, with different channel region being allocated to user equipment adopting the different number of downlink subframes, the acquiring module comprises:
a receiving module configured to receive a first start position of the channel region used by the present user equipment as provided by a base station, wherein the used channel region is determined based on the highest number of downlink subframes; and a first summing module configured to sum the first start position and a first offset of the present user equipment in the used channel region to obtain the device channel resource(s) occupied by the present user equipment in the used channel region, wherein the first offset is determined by the present user equipment through blind detection;

wherein the obtained device channel resources are used for feeding back HARQ;

a determining module configured to determine, based on information provided by the base station, respective second offsets of second start positions of channel regions, which including respective lowest enhanced control channel element identifications, with respect to a third start position of the channel resource(s), wherein the information provided by the base station-includes at least one of the following, information about the number of PRB pairs included in one downlink subframe and allocated to the enhanced physical downlink control channel, and the number of enhanced control channel elements included in one downlink subframe, wherein the enhanced control channel elements of each downlink subframe are divided into N groups, each channel region corresponds to one group of enhanced control channel elements, and a plurality of groups of enhanced control channel elements of the plurality of downlink subframe are distributed with an interleaved mode, N is a parameter, the determining module comprises:

a third sub-determining module configured to determine the number $N_p^m$ of enhanced control channel elements included in the first p groups of enhanced control channel elements of a downlink subframe based on the information provided by the base station, wherein $0 \leq p \leq N-1$, m represents the serial number of the downlink subframe, and $1 \leq m \leq M$ is the highest number of downlink subframes;

a fourth sub-determining module configured to cause p to vary in a range from 0 to N−1, and compare the number $N_p^m$ of the enhanced control channel elements included in the first p groups of enhanced control channel elements of respective downlink subframes and the number $N_{p+1}^m$ of the enhanced control channel elements included in the first p+1 groups of enhanced control channel elements with the third offset $n_{eCCE}^m$, respectively, till $N_p^m \leq n_{eCCE}^m < N_{p+1}^m$, then determine that the channel region corresponding to the p+1 group of enhanced control channel elements of each downlink subframe is the channel region that includes the lowest enhanced control channel element identification, and determine respective second offsets Δ according to the following equation:

$$\Delta = p \times \sum_{l=1}^{M} \left\lfloor \frac{N_{eCCE}^m}{N} \right\rfloor + \sum_{l=1}^{m-1} \left\lfloor \frac{N_{eCCE}^m}{N} \right\rfloor;$$

wherein, $N_{eCCE}^m$ is the number of enhanced control channel elements included in the downlink subframe m, $1 \leq l \leq M$, $$\sum_{l=1}^{0} \left\lfloor \frac{N_{eCCE}^m}{N} \right\rfloor = 0;$$

wherein, the second summing module comprises:
  a second sub-summing module configured to sum the respective second offsets Δ, the third start position and the third offset, and subtract the number $N_p^m$ of the enhanced control channel elements from the sum;
  a second summing module configured to obtain the plurality of device channel resources occupied by the present user equipment in the channel resources based on the respective second offsets, the third start position and a third offset of the present user equipment starting from the third start position, wherein the third start position is provided by the base station, and the third offset is determined by the present user equipment through blind detection.

* * * * *